Patented Aug. 7, 1945

2,381,421

UNITED STATES PATENT OFFICE 2,381,421

METHOD OF TREATING CEREAL GRAINS

Arnold K. Balls, Washington, D. C., and Walter S. Hale, Alexandria, Va., assignors to Claude R. Wickard as Secretary of Agriculture of the United States of America, and to his successors in office No Drawing. Application March 12, 1942, Serial No. 434,308

2 Claims. (Cl. 99—153)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to cereal grain and is directed to a method of preserving grain in storage.

Stored grain is subject to spontaneous heating, a process which is mostly responsible for the deterioration of the grain in storage.

Spontaneous heating of cereal grains such as wheat, corn, rye, barley, oats, etc., is to a great extent the result of a respiratory process. A living cereal grain, like other viable seeds, is a dormant form of plant life, and like all living organisms the grain respires, that is absorbs oxygen and liberates carbon dioxide. Respiration is an exothermic process, and therefore all living grain generates heat. Under normal conditions the rate of this respiration is so slow that the liberated heat is dissipated by radiation and no rise in temperature results. Under certain conditions, however, the respiration may be greatly increased; when this occurs in a large bulk of grain the heat evolved is not dissipated fast enough, the temperature of the grain rises rapidly until it reaches a level where considerable damage to the grain results.

The rate of respiration of grain is strongly stimulated by the moisture content and the temperature. The higher the ambient temperature the lower must be the moisture content in order to obviate the development of heat. Whenever damp grain heats in storage mold growth generally takes place; mold organisms respire and hence generate heat. The cumulative effect of these contributing factors is such a rapid evolution of heat that the process can be arrested only by cooling or drying of the grain.

Storage and transportation of grain containing considerable amounts of moisture is therefore connected with great difficulties especially during warm weather. Heretofore it has not been possible, for example, to shell and store corn immediately after the harvest. Freshly harvested corn contains large amounts of moisture and if shelled and stored it usually heats up and spoils as soon as the weather becomes warm. Corn is therefore generally stored on the cob, in well ventilated cribs over a period of time, usually through the winter. During this time its moisture content is greatly reduced and it may then be shelled and stored in bins. It is obvious that if the corn could be shelled and stored immediately after being harvested the grower could sell it without delay and thus avoid the risk of a prolonged storage.

Cereal crops are also frequently harvested under unfavorable weather conditions. Heavy losses from heating occur in storage and in transit of such damp grain. Unfavorable weather conditions are particularly harmful whenever the grain is harvested by combine. Combine harvested grain is frequently unripe. Such unripe grain, for instance wheat, tends to heat more readily because the wheat undergoes "sweating" in subsequent storage. The sweating process provides further favorable conditions for heating of the grain. The heating wheat may be cooled off by removing it from the bin and letting it fall through a current of air blown by a fan. This treatment, known as "moving" the wheat over the separators, is a very costly expedient, the price of moving the grain being about ¼ to ½ cent per bushel.

We have discovered that heating of cereal grain can be inhibited and the biological activity of the grain maintained on a low level for considerable periods of time without adversely affecting any of the properties of the treated material, by contacting the grain with ethylene. While the treatment according to the method of our invention will not preclude the development of heat on subsequent storages of the treated grain, under any and all conditions, it will inhibit this evolution of heat to such an extent that the treated grain can be safely stored over extensive periods of time, while a similar but untreated grain, stored under identical conditions will heat up and deteriorate.

The treatment according to the method of our invention is effected by exposing the grain to an atmosphere containing ethylene. We prefer to carry out our invention by contacting the grain with an atmosphere containing 1 part ethylene per 10,000–100,000 parts of air. In using such a concentration of ethylene one treatment is usually sufficient to attain the desired result. Under certain conditions which are especially favorable to the development of heat for instance when the grain contains an exceptionally large amount of moisture, several consecutive treatments may be made to attain the full benefit of the process and to maintain its effects over an extended period of time.

As a result of the treatment according to the method of our invention, and immediately subsequent to it, the respiration rate of the treated grain will usually rise for a short period of time. This brief increase of the biological activity of the treated grain may result in a slight rise of the temperature. This transitory effect subsides rapidly, however, and thereafter the treated grain will remain quiescent for a prolonged period of time. A similar but untreated grain, kept under identical conditions, will begin to generate heat. This evolution of heat will increase steadily and finally result in a complete spoilage of the grain.

The process of our invention may be practiced, for example, by admitting a known volume of ethylene gas into a reasonably air-tight receptacle of known capacity and thereafter exposing the grain to the gaseous mixture. A known volume of ethylene gas may be admitted, for instance, from a cylinder, by means of a pipe leading from the cylinder into a grain bin of known capacity while the grain is being charged into the bin through the chute. The grain falling through the bin is thus exposed to the action of the ethylene gas. The necessary amount of ethylene may be introduced into the bin at one time or in increments over a period of time. The process may be further modified by the use of mechanical means such as fans, to effect thorough intermixture and circulation of the gases, or the ethylene may be diluted beforehand with the necessary amount of air, and the gaseous mixture forced through the grain in the bin.

The invention may be further illustrated by the following example, although it is not restricted to such specific embodiment: 250 cc. of ethylene gas were introduced into a 350-bushel metal bin, which was then filled with combine-harvested wheat containing 17.1 percent moisture. Within 45 minutes following the first addition of ethylene, and while the wheat was being poured into the bin, an additional 750 cc. of ethylene gas were introduced into the bin in three equal portions of 250 cc. each introduced at 15-minute intervals. The same quantity of similar wheat was charged into an identical bin. The temperature of the grain in each of the two bins was determined at intervals, and over a period of time, by means of a number of thermocouples placed at various levels through the bulk of the grain. The average temperatures of the treated and untreated grain are given in the following table:

| Days in storage | Temperature in degrees Farenheit | |
|---|---|---|
| | Ethylene-treated wheat | Untreated wheat |
| 0 | 98 | 93 |
| 2 | 99 | 96 |
| 4 | 100 | 98 |
| 6 | 100 | 101 |
| 8 | 100 | 108 |
| 10 | 101 | 113 |

These data show that while the temperature of the grain treated with ethylene remained practically constant, the temperature of the untreated grain increased steadily, and after 10 days this grain had to be removed from the bin to prevent scorching.

Similar results were obtained in applying the ethylene treatment to other cereal grains.

It is known that as far as the heating of stored grain is concerned it is immaterial whether the high moisture content of the grain is due to harvesting and storage before sufficient desiccation has taken place or to an addition of water to dry grain as may occur, for instance, when the grain is wetted by rains. The method of our invention is not limited, therefore, to the treatment of damp grain, but may be used also for the treatment of dry grain which is thereby protected against spontaneous heating should the moisture content of the treated grain increase during subsequent handling and storage.

Having thus described our invention, what we claim for Letters Patent is:

1. The method of charging a storage bin with living cereal grain bulk to prevent harmful increases of temperature of the grain during subsequent storage of the grain in the bin comprising introducing the grain in the bin simultaneously with ethylene gas diluted with 10,000 to 100,000 parts of air per part of the ethylene gas.

2. The method of mitigating spontaneous heating of living cereal grain bulk stored under such conditions that the grain would tend to increase in temperature to a point where it would be harmful to the grain comprising subjecting the grain bulk to the action of ethylene gas diluted with 10,000 to 100,000 parts of air per part of the ethylene gas.

ARNOLD K. BALLS.
WALTER S. HALE.